United States Patent
Singh et al.

(10) Patent No.: US 9,313,261 B2
(45) Date of Patent: Apr. 12, 2016

(54) SYSTEM AND METHODS OF TRANSFERRING TASKS FROM A FIRST MOBILE DEVICE TO A SECOND MOBILE DEVICE

(71) Applicant: QUALCOMM Incorporated, San Diego, CA (US)

(72) Inventors: Balvinder P. Singh, Hydrabad (IN); Nitin Kumar Shivpure, Hydrabad (IN)

(73) Assignee: QUALCOMM Incorporated, San Diego, CA (US)

( * ) Notice: Subject to any disclaimer, the term of this patent is extended or adjusted under 35 U.S.C. 154(b) by 302 days.

(21) Appl. No.: 13/788,565

(22) Filed: Mar. 7, 2013

(65) Prior Publication Data

US 2014/0258357 A1    Sep. 11, 2014

(51) Int. Cl.
| | |
|---|---|
| *G06F 15/16* | (2006.01) |
| *H04L 29/08* | (2006.01) |
| *G06F 9/48* | (2006.01) |
| *G06F 9/50* | (2006.01) |
| *H04W 4/00* | (2009.01) |
| *G08C 17/00* | (2006.01) |
| *H04L 12/66* | (2006.01) |
| *H04M 1/00* | (2006.01) |

(52) U.S. Cl.
CPC ............. *H04L 67/10* (2013.01); *G06F 9/4856* (2013.01); *G06F 9/5094* (2013.01); *H04L 67/34* (2013.01); *H04W 4/003* (2013.01); *Y02B 60/142* (2013.01); *Y02B 60/144* (2013.01); *Y02B 60/162* (2013.01)

(58) Field of Classification Search
CPC ... H04W 4/20; H04W 52/02; H04W 52/0261; H04W 52/0264; H04W 52/0277; H04W 4/003; H04L 67/10; H04L 67/34; Y02B 60/144; Y02B 60/142; Y02B 60/162
USPC .................. 709/201; 370/352, 311; 455/455.2
See application file for complete search history.

(56) References Cited

U.S. PATENT DOCUMENTS

| | | | |
|---|---|---|---|
| 8,027,750 B2 | 9/2011 | Orita et al. | |
| 8,073,498 B2 | 12/2011 | Reinisch et al. | |
| 8,913,838 B2* | 12/2014 | Majumder | G06K 9/00979 382/224 |
| 2006/0095582 A1 | 5/2006 | Nitya et al. | |
| 2011/0130150 A1 | 6/2011 | Kolding et al. | |
| 2011/0307573 A1 | 12/2011 | Lingafelt et al. | |
| 2012/0324259 A1 | 12/2012 | Aasheim et al. | |
| 2013/0047004 A1 | 2/2013 | Hwang | |
| 2013/0178192 A1* | 7/2013 | McDonald | H04W 12/06 455/411 |

OTHER PUBLICATIONS

Bluetooth, "Specification of the Bluetooth System", Covered Core Package version: 4.0, Jun. 30, 2010, vol. (0-6), pp. 1-2302.
Mas, et al., "IPTV Session Mobility", Ericsson Research, 2009, 7pgs.

* cited by examiner

*Primary Examiner* — Wen-Tai Lin
(74) *Attorney, Agent, or Firm* — Austin Rapp & Hardman

(57) ABSTRACT

A method includes selecting a target mobile device based on information regarding a power storage level of the particular mobile device. The method further includes transmitting program context information associated with a task of the first mobile device to a network accessible storage device. The method further includes transmitting a notification regarding the program context information to the target mobile device. The present disclosure describes a power and task (data and/or voice) handover system that enables a user to transfer task(s) from one mobile device to another mobile device using a network (wired or wireless) based handover scheme.

38 Claims, 6 Drawing Sheets

SYSTEM AND METHODS OF TRANSFERRING TASKS FROM A FIRST MOBILE DEVICE TO A SECOND MOBILE DEVICE

I. FIELD

The present disclosure relates to transferring tasks between mobile devices.

II. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Many such wireless telephones incorporate additional devices to provide enhanced functionality for end users. For example, a wireless telephone can also include a digital still camera, a digital video camera, a digital recorder, and an audio file player. Also, such wireless telephones can execute software applications, such as a web browser application that can be used to access the Internet. As such, these wireless telephones can include significant computing capabilities.

A mobile device (e.g., a cell phone, a tablet computer, a laptop computer, etc.) typically uses a battery as a power source when the mobile device is not plugged into an electrical outlet. A user of the mobile device may perform different tasks on the mobile device, such as browsing websites via a web browser program, making a phone call, etc. However, when the mobile device is low on battery power and no charging device is readily available, the user may be forced to power off the mobile device to preserve the battery. Completely draining the power stored in the battery may damage a power storing capability of the battery. The user may interrupt tasks being performed on the mobile device by powering off the mobile device. The user may also lose state information of an application (e.g., a number of tabs open in a web browser program) running on the mobile device. While the user may resume performing the tasks and/or may manually restore the state of the application after the battery is charged and after the mobile device is again powered on, the user experiences time delay and inconvenience due to the interruption.

III. SUMMARY

When a mobile device is low on battery power and no electrical outlet is readily available for recharge or when the mobile device runs out of battery power, a user performing tasks on the mobile device may be forced to power off the mobile device. The user discontinues performing tasks until the mobile device is recharged. Thus, the user experiences a time delay and interruption in performing the tasks. Systems and methods described herein may advantageously enable a first mobile device to transfer tasks on the first mobile device to a second mobile device when the first mobile device experiences a low battery condition. Transferring the tasks from the first mobile device to the second mobile device may enable the user to continue performing the tasks on the second mobile device.

For example, a user may be in possession of a plurality of mobile devices (e.g., a mobile phone, a tablet computer, a laptop computer). The user may be performing one or more tasks (e.g., web browsing, phone calls, streaming music, etc.) on a first mobile device (e.g., the user's mobile phone) while the other mobile devices are in a sleep state. When the first mobile device detects that the battery power storage level of the first mobile device fails to satisfy a first threshold, such as the battery power storage level is less than or equal to a first threshold (e.g., 10% battery power remaining), the first mobile device may identify a second mobile device to take over processing/executing of one or more tasks. The first mobile device may select the second mobile device based on information regarding battery power storage levels and processing capabilities of the second mobile device. The first mobile device may communicate with the second mobile device to receive the information (e.g., via polling or periodic notifications from the other mobile devices). The first mobile device may communicate with the second mobile device via a low energy data link, such as a Bluetooth low energy (BLE) connection, an ANT connection, a near field communication (NFC) connection, etc. The use of the low energy data link may enable the first mobile device or the second mobile device to reduce power consumption associated with communication between the first mobile device and the second mobile device.

The first mobile device may transfer program context information associated with one or more tasks (e.g., websites the user is browsing, a number of tabs open in a web browser program, program state information, etc.) to a network accessible storage device (e.g., a cloud storage server) via a high energy data link, such as an Ethernet, cellular, or WiFi connection. The first mobile device may notify the second mobile device that the program context information is available at the network accessible storage device via a first notification message. The first notification message may be transmitted via near field communication (NFC) tapping (or via another communication method). In response to the first notification message, the second mobile device may wake up from the sleep state and may retrieve the program context information from the network accessible storage device. Based on the program context information, the second mobile device may process the one or more tasks at the second mobile device to allow the user to continue performing the one or more tasks.

For example, when browsing a particular website in a web browser program, the second mobile device may automatically execute a web browser program and load the particular website in the web browser program so that the user does not have to open the web browser program and reload the particular website. As another example, when the user is participating in a voice call on the first mobile device, the second mobile device may automatically (i.e., without user action) send a conference call request to the first mobile device to establish a conference call. The first mobile device may add the voice call to the conference call such that the voice call is handed over to the second mobile device via the conference call.

The second mobile device may also recharge the first mobile device (e.g., via wireless charging or wired charging). In an embodiment, the second mobile device may be integrated into (or connected to a component) an automobile that provides a power source. When the first mobile device's power storage level satisfies a second threshold (after recharging), the first mobile device may notify the second mobile device via a second notification message that the first mobile device is ready to take back processing of the one or more tasks. In response to the second notification message, the second mobile device may transfer program context information to the network accessible storage device. The second mobile device may notify the first mobile device that the program context is available at the network accessible storage device via a third notification message. In response to the third notification message, the first mobile device may retrieve the program context information from the network accessible storage device to resume processing the one or more tasks.

In an embodiment, a method includes selecting a target mobile device based on information regarding a power storage level of the target mobile device. The method further includes transmitting program context information associated with a task of the first mobile device to a network accessible storage device. The method further includes transmitting a notification regarding the program context information (e.g., a message indicating the availability of the program context information at the network accessible storage device) to the target mobile device.

In another embodiment, a method includes receiving, at a second mobile device, a notification from a first mobile device. The method also includes, in response to receiving the notification, retrieving program context information associated with a task of the first mobile device from a network accessible storage device. The notification indicates that the program context information is available at the network accessible storage device.

In another embodiment, an apparatus includes a processor and a memory. The memory stores instructions that are executable by the processor to select a target mobile device based on information regarding a power storage level of the particular mobile device. The instructions are further executable by the processor to initiate transmission of program context information associated with a task of the first mobile device to a network accessible storage device. The instructions are further executable by the processor to initiate transmission of a notification regarding the program context information to the target mobile device.

In another embodiment, an apparatus includes a processor and a memory. The memory stores instructions that are executable by the processor to, in response to a notification received from a first mobile device, retrieve, at a second mobile device, program context information associated with a task of the first mobile device from a network accessible storage device. The notification indicates that the program context information is available at the network accessible storage device.

One particular advantage provided by at least one of the disclosed embodiments is an ability of a first mobile device (e.g., a cell phone) to transfer a task of the first mobile device to a second mobile device (e.g., a tablet computer). Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
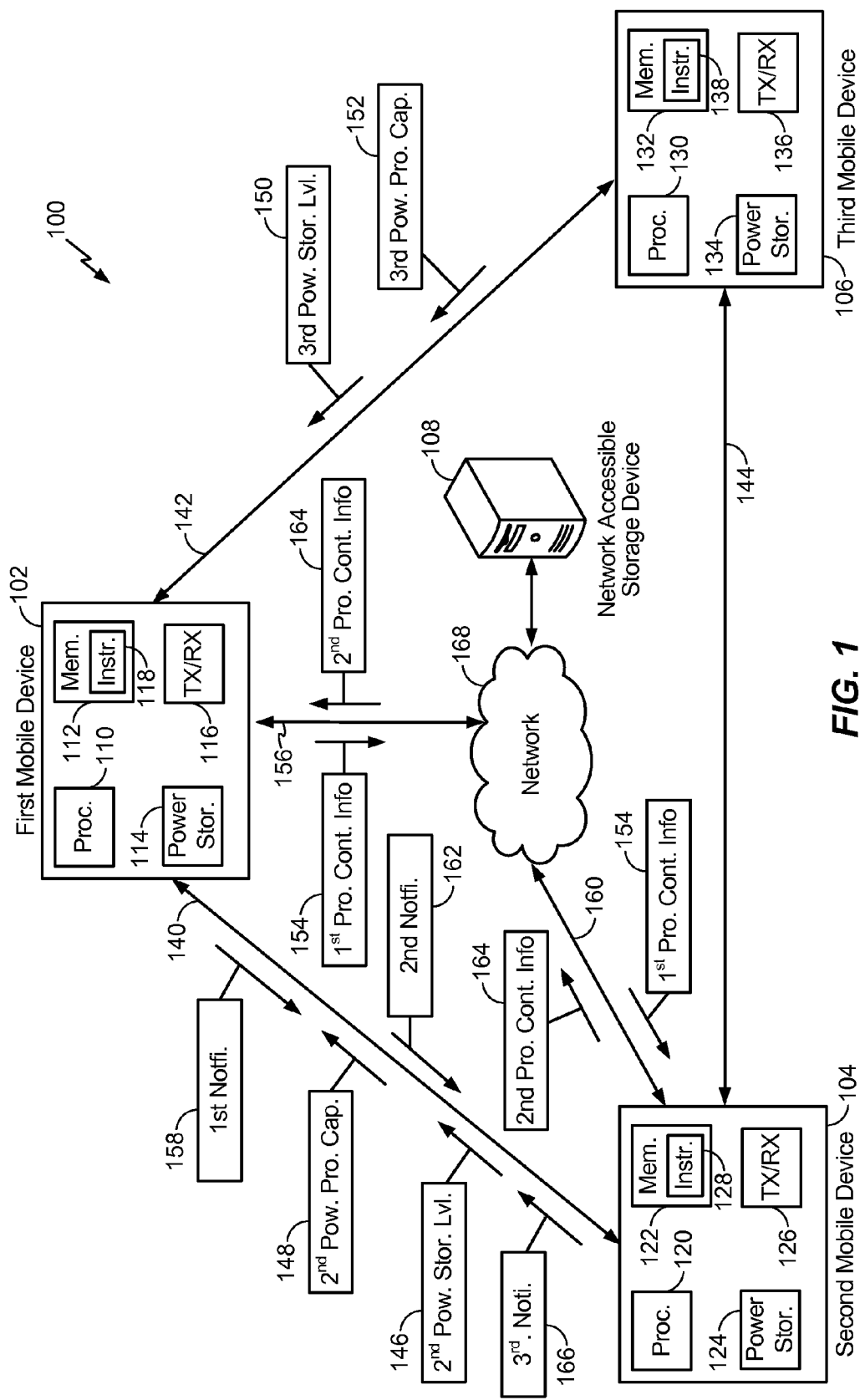
FIG. 1 is a diagram to illustrate a particular embodiment of a system that is operable to enable a first mobile device to transfer a task to a second mobile device.

FIG. 1 illustrates a particular embodiment of a system 100 that is operable to enable a first mobile device to transfer a task of the first mobile device to a second mobile device. The system 100 may include a first mobile device 102, a second mobile device 104, a third mobile device 106, and a network accessible storage device 108. The first mobile device 102, the second mobile device 104, and/or the third mobile device 106 may be a mobile telephone, a portable computing device (e.g., a laptop computer), a tablet computing device, a personal digital assistant (PDA), a portable media player, or any combination thereof. In a particular embodiment, the first mobile device 102, the second mobile device 104, the third mobile device 106, or any combination thereof may be integrated in (or coupled to a component of) a vehicle (e.g., an automobile). The network accessible storage device 108 may be a cloud storage device, a storage area network, a network accessible server, a network accessible server cluster with data storage capacity, or any combination thereof. The first mobile device 102, the second mobile device 104, and/or the third mobile device 106 may communicate with the network accessible storage device 108 via a network 168 (e.g., the Internet, a private network, etc.).

The first mobile device 102 may include a first processor 110, a first memory 112 coupled to the first processor 110, a first power storage device 114 (e.g., a battery), and a first transceiver 116. The first memory 112 may include first instructions 118 that are executable by the first processor 110. The second mobile device 104 may include a second processor 120, a second memory 122 coupled to the second processor 120, a second power storage device (e.g., a battery) 124, and a second transceiver 126. The second memory 122 may include second instructions 128 that are executable by the second processor 120. The third mobile device 106 may include a third processor 130, a third memory 132 coupled to the third processor 130, a third power storage device (e.g., a battery) 134, and a third transceiver 136. The third memory 132 may include third instructions 138 that are executable by the third processor 130.

During operation, the first mobile device 102 may process one or more tasks (e.g., browsing websites, playing network-based video games, running an application, conducting an audio and/or video conference call, etc.) for a user. The user may have access to the second mobile device 104 and the third mobile device 106. For example, the second mobile device 104 and the third mobile device 106 may be in a sleep mode and may be stored in the user's backpack or other carrying device. The first mobile device 102 may communicate with the second mobile device 104 and with the third mobile device 106 to identify a storage power level and a processing capability of each mobile device. For example, the first mobile device 102 may communicate with the second mobile device 104 via a low energy link 140, and the first mobile device 102 may communicate with the third mobile device 106 via a low energy link 142. The second mobile device 104 may communicate with the third mobile device 106 via a low energy link 144. In a particular embodiment, the low energy links 140, 142, 144 are Bluetooth low energy (BLE) connections. It is noted that other low energy connections, such as ANT connections, NFC connections, etc. may also be used.

The first mobile device 102 may monitor a first power storage level (e.g., a battery power level) of the first power storage device 114. The first mobile device 102 may compare the first power storage level to a first threshold and to a second threshold. When the first mobile device 102 determines that the first power storage level fails to satisfy a first threshold, the first mobile device 102 may transfer the one or more tasks to another mobile device so that the user may resume performing the one or more tasks on the other mobile device with reduced delay and interruption (as compared to waiting for a recharge of the first mobile device 102). The first threshold may correspond to a particular capacity level of the first power storage device 114. For example, the first threshold may correspond to a 10% capacity level of the first power storage device 114. When the first power storage level falls to a level that is less than or equal to 10% of the capacity level, the first mobile device 102 may determine that the first power storage level fails to satisfy the first threshold. In other embodiments, the power storage level may fail to satisfy the first threshold when the first power level is less than a certain percentage of the capacity level. In other embodiments, a different threshold method may be used (e.g., a fixed value).

After detecting that the first power storage level fails to satisfy the first threshold, the first mobile device 102 may select a target mobile device from a plurality of mobile devices as a destination for the task transfer. For example, the first mobile device 102 may select the second mobile device 104 or the third mobile device 106.

The first mobile device 102 may select a particular mobile device for task transfer based on information regarding a power storage level of the particular mobile device and a processing capability of the particular mobile device. For example, the first mobile device 102 may select a mobile device with a highest power storage level among the plurality of mobile devices (e.g., the second mobile device 104 and the third mobile device 106) that is capable of the tasks(s) being transferred. The processing capability may indicate whether the particular mobile device is able to process a particular task. For example, the processing capability may indicate whether the particular mobile device is able to process a particular software program, a voice and/or video call, a voice-over-internet-protocol call, or any combination thereof.

The second mobile device 104 may transmit information regarding a second power storage level 146 and a second processing capability 148 of the second mobile device 104 to the first mobile device 102 periodically. Similarly, the third mobile device 106 may transmit information regarding a third power storage level 150 and a third processing capability 152 of the third mobile device 106 to the first mobile device 102 periodically. The first mobile device 102 may receive information regarding the second power storage level 146 and the second processing capability 148 of the second mobile device 104 and information regarding the third power storage level 150 and the third processing capability 152 of the third mobile device 106. The first mobile device 102 may store the information regarding the second power storage level 146, the second processing capability 148, the third power storage level 150, the third processing capability 152, or any combination thereof in the first memory 112.

The first mobile device 102 may compare the second power storage level 146 to the third power storage level 150. The first mobile device 102 may also compare the second processing capability 148 and the third processing capability 152 to the one or more tasks being performed on the first mobile device 102. When results of the comparisons indicate that the second mobile device 104 has a higher power storage level than the third mobile device 106 and the second mobile device 104 has the processing capability to process the one or more tasks on the first mobile device 102, the first mobile device 102 may select the second mobile device 104 for task transfer. When results of the comparisons indicate that the third mobile device 106 has a higher power storage level than the second mobile device 104 and the third mobile device 106 has the processing capability to process the one or more tasks, the first mobile device 102 may select the third mobile device 106 for task transfer.

In a particular embodiment, the first mobile device 102 receives the information regarding the second power storage level 146, the second processing capability 148, the third power storage level 150, the third processing capability 152, or any combination thereof as a result of periodic polling. The first mobile device 102 may stop polling the second mobile device 104 and the third mobile device 106) to conserve power when the first power storage level is less than or equal to the first threshold or when the first power storage level is close to the first threshold. In another particular embodiment, the periodic polling starts after the first power storage level is less than or equal to the first threshold or when the first power storage level is close to the first threshold. In alternate embodiments, other threshold methods may be used.

In another particular embodiment, the first mobile device 102 receives the information regarding the second power storage level 146 and/or the second processing capability 148 via a push notification from the second mobile device 104 and receives the information regarding the third power storage level 150 and/or the third processing capability 152 via a notification from the third mobile device 106. For example, such push notifications may be sent in response to certain state changes (e.g., a battery power level at the second mobile device 104 dropping from 100% to 90%). In another particular embodiment, the push notification is not transmitted to the first mobile device 102 when the first power storage level is less than or equal to the first threshold or when the first power storage level is close to the first threshold.

As an example, in one scenario the second mobile device 104 is selected as a target mobile device for task transfer. The first mobile device 102 may transmit first program context information 154 associated with the one or more tasks to the network accessible storage device 108 via a high energy link 156 (e.g., a WiFi connection, a cellular connection, etc.). The first program context information 154 may include state information associated with a program, application data, a presence of a voice call, a subscriber identity module (SIM) card number, a phone operator name, a call roaming state, a volume level, a microphone status (e.g., muted or not), or any combination thereof. The first mobile device 102 may transmit a first notification 158 regarding the first program context information 154 that is available at the network accessible storage device 108 to the second mobile device 104 via the low energy link 140. In a particular embodiment, the first mobile device 102 transmits the first notification 158 in accordance with a near field communication (NFC) protocol. For example, the first mobile device 102 may transmit the first notification 158 to the second mobile device 104 via NFC tapping. After transmitting the first notification 158 and completing transmitting of the first program context information 154, the first mobile device 102 may be powered off or may go into a sleep state to conserve power. The first mobile device 102 may wait for acknowledgement of a successful task transfer from the second mobile device 104 before being powered off. In a particular embodiment, the first notification 158 includes information regarding an address of the network accessible storage device 108 (e.g., a network address, an internet protocol address, a web address), credential information (e.g., a user name and/or a password) needed to access the network accessible storage device 108, or any combination thereof.

In response to the first notification 158, the second mobile device 104 may retrieve the first program context information 154 from the network accessible storage device 108 via a high energy link 160. In a particular embodiment, the high energy links 156 and 160 are wired or wireless connections, such as Ethernet or WiFi. In a particular embodiment, such as when the first mobile device 102 and the second mobile device 104 are mobile telephony devices, the high energy links 156 and 160 are high speed wireless network connections, such as Code division multiple access (CDMA) connections, Global System for Mobile Communications (GSM) connections, 3rd Generation Partnership Project (3GPP) connections, CDMA2000 connections, Worldwide Interoperability for Microwave Access (WiMAX) connections, 3GPP Long Term Evolution (LTE) connections, mobile WiMAX connections, etc. Communicating data via a low energy radio link typically consumes less power than communicating the same data via a high energy radio link.

In a particular embodiment, the second mobile device 104 is in a sleep state prior to receiving the first notification 158. In response to the first notification 158, the second mobile device 104 wakes up from the sleep state and retrieves the first program context information 154. In a particular embodiment, the first mobile device 102 transmits the first notification 158 concurrently with the first program context information 154. In an alternate embodiment, the first mobile device 102 transmits the first notification 158 subsequent to transmitting the first program context information 154. The second mobile device 104 may determine whether the first program context information 154 is associated with application data and/or a voice call on the first mobile device 102 by examining the first program context information 154.

The second mobile device 104 may examine the first program context information 154 to determine how to process one or more tasks associated with the first program context information 154. For example, the first program context information 154 may identify an application that was running on the first mobile device 102 prior to task transfer, selected/enabled options within the application, content inserted into the application (e.g., text typed by the user), etc. Based on the first program context information 154, the second mobile device 104 may perform one or more actions, such as executing an appropriate application or initiating a call, so that the one or more tasks are transferred to the second mobile device 104.

For example, the first program context information 154 may indicate text input by the user in a particular word processing application executed on the first mobile device 102. The first program context information 154 may also indicate that a highlight function in the word processing application is activated. The second mobile device 104 may automatically execute the word processing application according to the first program context information 154 such that the text is inserted into the word processing application and the highlight function is selected. As another example, the first program context information 154 may indicate particular websites accessed by a particular web browser program. The second mobile device 104 may automatically execute the web browser program and automatically access the particular websites based on the first program context information 154. Thus, the user may continue performing the tasks (e.g., web browsing or word processing) on the second mobile device 104. The first program context information 154 may be updated by the second mobile device 104 as the user continues performing the one or more tasks on the second mobile device 104, so that the user does not lose work performed at the second mobile device 104 if the task is subsequently transferred from the second mobile device 104 to another device.

When the first program context information 154 is associated with a voice call on the first mobile device 102, the second mobile device 104 may perform a handover to the first mobile device 102. For example, the second mobile device 104 may initiate a conference call with the first mobile device 102 and the voice call is added to the conference call. The second mobile device 104 may transmit a conference call request (e.g., a handover command) to the first mobile device 102 to initiate the conference call. The first mobile device 102 may accept the conference call request to enable the conference call. The first mobile device 102 adds the voice call to the conference call, and the first mobile device 102 may then disconnect from the conference call once the conference call is set up. When the voice call is added to the conference call, the voice call is in effect transferred from the first mobile device 102 to the second mobile device 104. When the first program context information 154 is associated with application data and with a voice call, the second mobile device 104 may initiate the conference call concurrently with executing the applications indicated in the first program context information 154. Although the foregoing example describes the second mobile device 104 as the target mobile device, it should be understood that the third mobile device 106 and/or other mobile devices may be selected as a target mobile device for task transfer.

While the user resumes performing transferred tasks on another device, the first power storage device 114 of the first mobile device 102 may be recharged so that the user may use the first mobile device 102 (after recharge). The first power storage device 114 may be recharged concurrently with a task transfer or after the task transfer. For example, the first power storage device 114 may be recharged by the second mobile device 104 while the first mobile device 102 initiates task transfer to the second mobile device 104, during the task transfer process, after the task transfer, or any combination thereof. In another particular embodiment, the second mobile device 104 (or the third mobile device 106) recharges the first power storage device 114 wirelessly (e.g., via inductive charging). In a particular embodiment, the second mobile device 104 (or the third mobile device 106) recharges the first storage device 114 via a wired power connection, such as a universal serial bus (USB) connection. While the second mobile device 104 (or the third mobile device 106) recharges the first mobile device 102, the second mobile device 104 (or the third mobile device 106) may monitor the first power storage level. The first mobile device 102 may also monitor the first power storage level during recharge.

In a particular embodiment, when the second mobile device 104 is integrated into (or coupled to a component of) an automobile, the automobile recharges the first power storage device 114 via wireless recharging and/or wired recharging. For example, the automobile may use electricity from a built-in power generation system (e.g., an alternator or a battery) to recharge the first power storage device 114. As another example, the automobile may use built-in solar panels to generate electricity to recharge the first power storage device 114. Similarly, when the second mobile device 104 is integrated into (or coupled to a component of) another transportation vehicle (e.g., an airplane or a ship), the other transportation vehicle may use built-in power generation systems to recharge the first power storage device 114.

When the first power storage level satisfies the second threshold, the first mobile device 102 may transmit a second notification 162 to the second mobile device 104 via the low energy link 140. The second threshold may correspond to a particular capacity level of the first power storage device 114. The second threshold may be greater than the first threshold. For example, the second threshold may correspond to a 30% capacity level of the first power storage device 114. When the first power storage level reaches or passes the 30% capacity level (after recharge), the first mobile device 102 may determine that the first power storage level satisfies the second threshold. Other thresholds and other threshold methods may be used.

The second notification 162 may indicate that the first power storage level satisfies the second threshold. In response to receiving the second notification 162, the second mobile device 104 may transmit second program context information 164 associated with one or more tasks to the network accessible storage device 108. The second mobile device 104 may transmit a third notification 166 to the first mobile device 102 to indicate that the second program context information 164 is available at the network accessible storage device 108. In response to the third notification 166, the first mobile device 102 may retrieve the second program context information 164 to resume processing of one or more previously transferred tasks and/or one or more newly transferred tasks.

After the second mobile device 104 takes over processing of the one or more tasks from the first mobile device 102, the second mobile device 104 may initiate task transfer to another mobile device. For example, the second mobile device 104 may monitor the second power storage level 146 and may communicate with the third mobile device 106 to identify the third power storage level 150 and the third processing capability 152. When the second power storage level 146 fails to satisfy a threshold (e.g., the second power storage level 146 drops to 30% capacity or less than 30% capacity), the second mobile device 104 may select another mobile device (e.g., the third mobile device 106) to take over processing of one or more tasks of the second mobile device 104. Thus, in-progress tasks may be transferred between devices multiple times (e.g., a task is transferred from the first mobile device 102 to the second mobile device 104 and from the second mobile device 104 to the third mobile device 106) in response to low power storage level conditions (e.g., low battery power conditions). It will be appreciated that such transfers may enable a user to use a larger amount of total electric power (e.g., battery power) of multiple devices for tasks. For example, each of the mobile devices 102, 104, 106 may have a 2000 milli-ampere hours (mAh) battery power capacity. By nature of the task transfer capability of the system 100 of FIG. 1, a total battery power capacity available to the user may be (or may approach) 6000 mAh (instead of the 2000 mAh of the first mobile device 102).

In a particular embodiment, when the first mobile device 102 determines that none of the other mobile devices (e.g., the second mobile device 104 and the third mobile device 106) has the processing capability to process every task of the first mobile device 102, the first mobile device 102 may transfer individual tasks (via the network accessible storage device 108) to separate mobile devices that have the capability to process the individual tasks. When there is more than one mobile device with the capability to process the individual tasks, the first mobile device 102 transfers the individual tasks to a particular mobile device based on a selection criteria (e.g., a highest storage power level, a lowest processing load, etc.).

The system 100 may thus enable a first mobile device to transfer task(s) to other mobile device(s) so that the user may continue to perform the task(s) on the other mobile device(s). Transferring a task may reduce delay and interruption as compared to restarting the task on the second mobile device(s).

Figure 2:
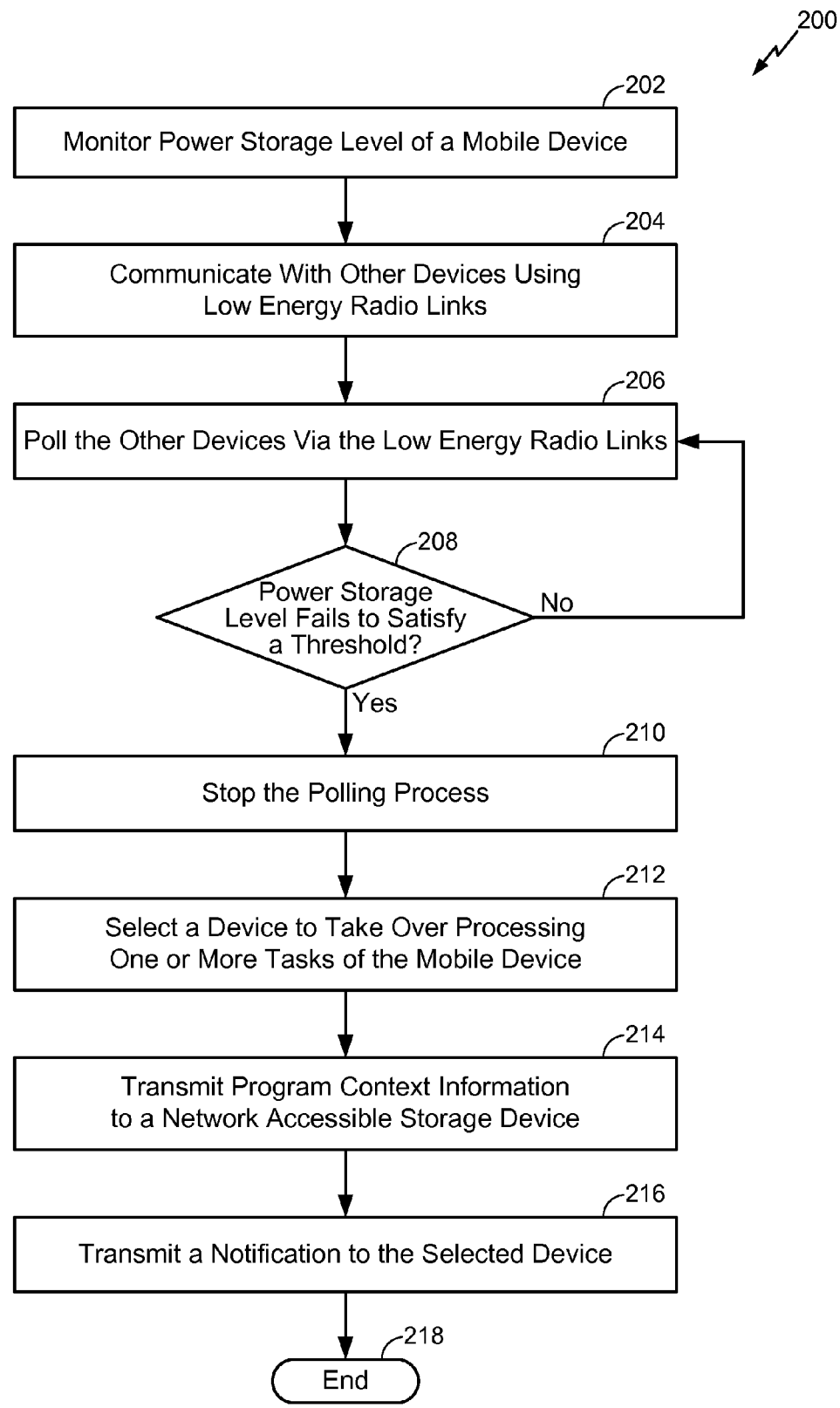
FIG. 2 is a flowchart to illustrate a particular embodiment of a method of operation at a first mobile device to transfer a task to a second mobile device.

FIG. 2 is a flowchart to illustrate a particular embodiment of a method 200 of operation at a first mobile device (e.g., the first mobile device 102 of FIG. 1) to transfer a task to a second mobile device (e.g., the second mobile device 104 or the third mobile device 106). The method 200 includes monitoring a power storage level of a mobile device, at 202. For example, referring to FIG. 1, the first mobile device 102 may monitor the first storage power level. The method 200 also includes communicating with other devices using low energy radio links, at 204. For example, referring to FIG. 1, the first mobile device 102 may communicate with the second mobile device 104 via the low energy link 140 and with the third mobile device 106 via the low energy link 142. In a particular embodiment, the method 200 further includes polling the other devices via the low energy radio links, at 206. For example, referring to FIG. 1, the first mobile device 102 may communicate with the second mobile device 104 and with the third mobile device 106 to receive information regarding respective storage power level and processing capability.

The method 200 further includes determining whether the storage power level of the mobile device fails to satisfy a threshold, at 208. For example, referring to FIG. 1, the first mobile device 102 may determine that the first storage power level fails to satisfy the first threshold. When the storage power level of the mobile device satisfies the threshold, the method 200 returns to 206. When the first storage power level fails to satisfy the threshold, the method 200 further includes stopping the polling process, at 210. For example, referring to FIG. 1, the first mobile device 102 may stop polling the second mobile device 104 and the third mobile device 106 when the first storage power level fails to satisfy the first threshold. The method 200 further includes selecting a device to take over processing of one or more tasks of the mobile device, at 212. For example, referring to FIG. 1, the first mobile device 102 may select the second mobile device 104 or the third mobile device 106 to take over processing of the one or more tasks on the first mobile device 102. The method 200 further includes transmitting program context information to a network accessible storage device, at 214. For example, referring to FIG. 1, the first mobile device 102 may transmit the first program context information 154 to the network accessible storage device 108. The method 200 further includes transmitting a notification to the selected device, at 216. For example, referring to FIG. 1, the first mobile device 102 may transmit the first notification 158 to the second mobile device 104. The first notification 158 indicates that the first program context information 154 is available at the network accessible storage device 108. The one or more tasks may then be transferred from the first mobile device 102 to another device. The method 200 ends at 218. The method 200 may enable a first mobile device to transfer task(s) to second mobile device(s) such that the user may continue to perform the task(s) on the second mobile device(s).

Figure 3:
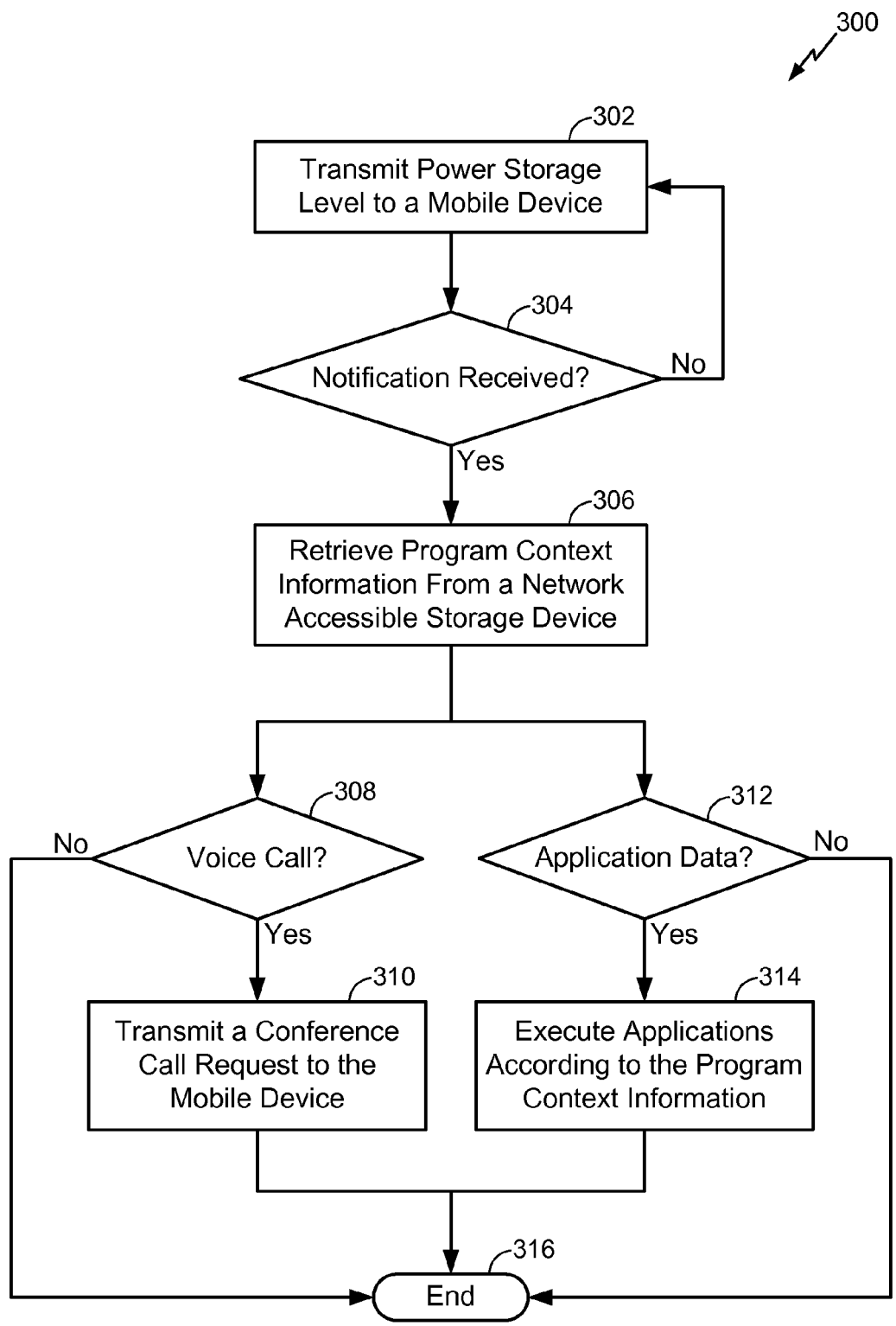
FIG. 3 is a flowchart to illustrate a particular embodiment of a method of operation at a second mobile device to receive a task transfer from a first mobile device.

FIG. 3 is a flowchart to illustrate a particular embodiment of a method 300 of operation at a second mobile device to receive a task transfer from a first mobile device. The method 300 includes transmitting a power storage level to a mobile device, at 302. For example, referring to FIG. 1, the second mobile device 104 may transmit information regarding the second power storage level 146 and the second processing capability 148 to the first mobile device 102. The third mobile device 106 may transmit information regarding the third power storage level 150 and the third processing capability 152 to the first mobile device 102.

The method 300 also includes determining whether a notification is received, at 304. For example, referring to FIG. 1, the second mobile device 104 and/or the third mobile device 106 may determine whether the first notification 158 is received. When the notification is received, the method 300 further includes retrieving program context information from a network accessible storage device, at 306. For example, referring to FIG. 1, in response to the first notification 158, the second mobile device 104 may retrieve the first program context information 154 from the network accessible storage device 108. When the notification is not received, the method 300 returns to 302.

The method 300 further includes determining whether the program context information includes information associated with a voice call on the mobile device, at 308. For example, referring to FIG. 1, the second mobile device 104 may determine whether the first program context information 154 includes information associated with an ongoing voice call on the first mobile device 102. When the program context information includes information associated with the voice call, the method 300 further includes transmitting a conference call request to the mobile device, at 310. For example, referring to FIG. 1, the second mobile device 104 may transmit the conference call request to the first mobile device 102 to initiate the conference call. The first mobile device 102 may accept the conference call request and add the voice call to the conference call. When the voice call is added to the conference call, the voice call is transferred from the first mobile device 102 to the second mobile device 104.

Alternatively, or in addition, the method 300 includes determining whether the program context information includes information associated with application data, at 312. When the program context information includes information associated with the application data, the method 300 further includes executing one or more applications according to the program context information, at 314. For example, referring to FIG. 1, the second mobile device 104 may automatically execute one or more applications according to the first program context information 154. The second mobile device 104 may also automatically restore state information of the one or more applications (e.g., automatically load a particular website in a web browser program, insert text previously input by the user in a word processing program, etc.). When the program context information does not include information associated with the voice call and does not include information associated with the application data, the method 300 ends, at 316. Thus, the method 300 may enable a second mobile device to take over processing of task(s) transferred from a first mobile device such that the user may continue to perform the task(s) on the second mobile device.

Figure 4:
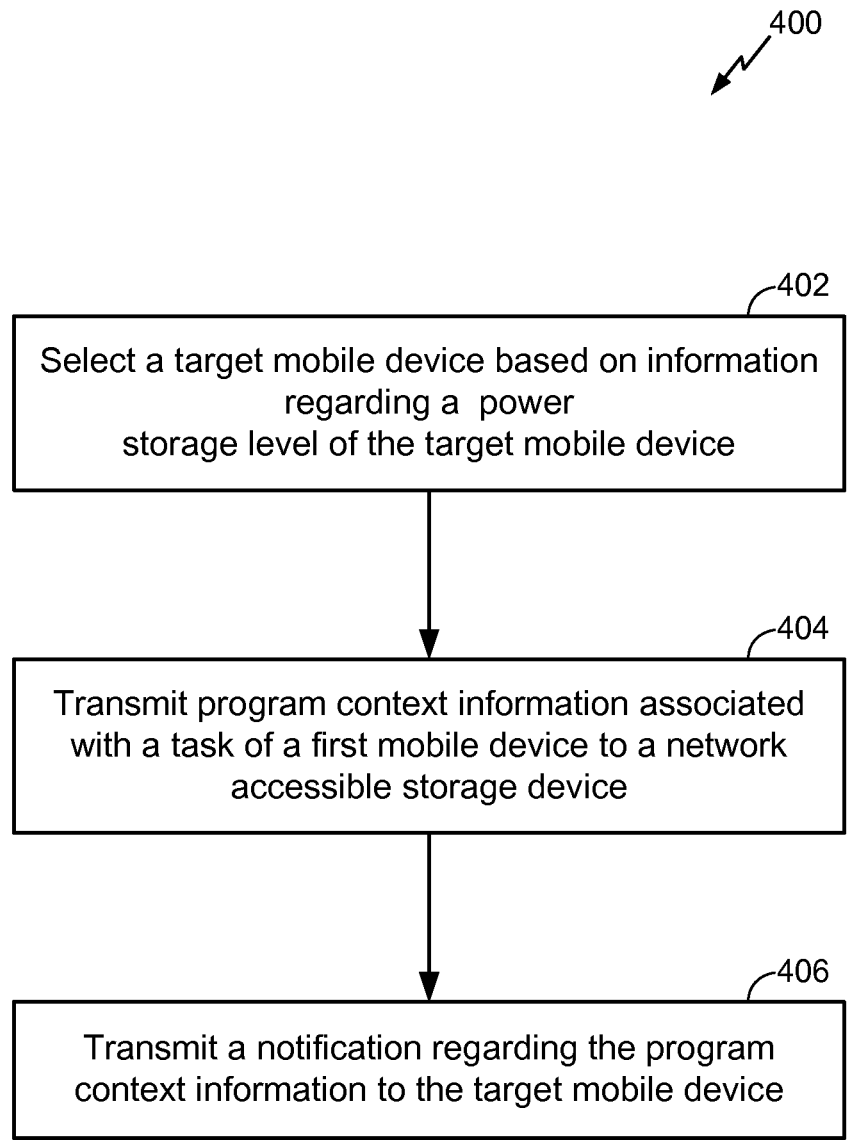
FIG. 4 is a flowchart to illustrate another particular embodiment of a method of operation at a first mobile device to transfer a task to a second mobile device.

FIG. 4 is a flowchart to illustrate another particular embodiment of a method 400 of operation at a first mobile device to transfer a task to a second mobile device. The method 400 includes selecting a particular mobile device based on information regarding a power storage level of the target mobile device when a first power storage level of a first mobile device fails to satisfy a first threshold, at 402. For example, referring to FIG. 1, when the first mobile device 102 determines that the first power storage level fails to satisfy the first threshold, the first mobile device 102 may select the second mobile device 104 based on information regarding the second power storage level 146 and the second processing capability 148.

The method 400 further includes transmitting program context information associated with a task of the first mobile device to a network accessible storage device, at 404. For example, referring to FIG. 1, the first mobile device 102 may transmit first program context information 154 associated with one or more tasks to the network accessible storage device 108 via a high energy link 156. The method 400 further includes transmitting a notification regarding the program context information to the target mobile device, at 406. The notification may indicate that the program context information is available at the network accessible storage device. For example, referring to FIG. 1, the first mobile device 102 may transmit the first notification 158 regarding the first program context information 154 to the second mobile device 104 via the low energy link 140. The first notification 158 indicates that the first program context information 154 is available at the network accessible storage device 108. The one or more tasks may then be transferred from the first mobile device 102 to another device. Thus, the method 400 may enable a first mobile device to transfer task(s) to second mobile device(s) such that the user may continue to perform the task(s) on the second mobile device(s).

Figure 5:
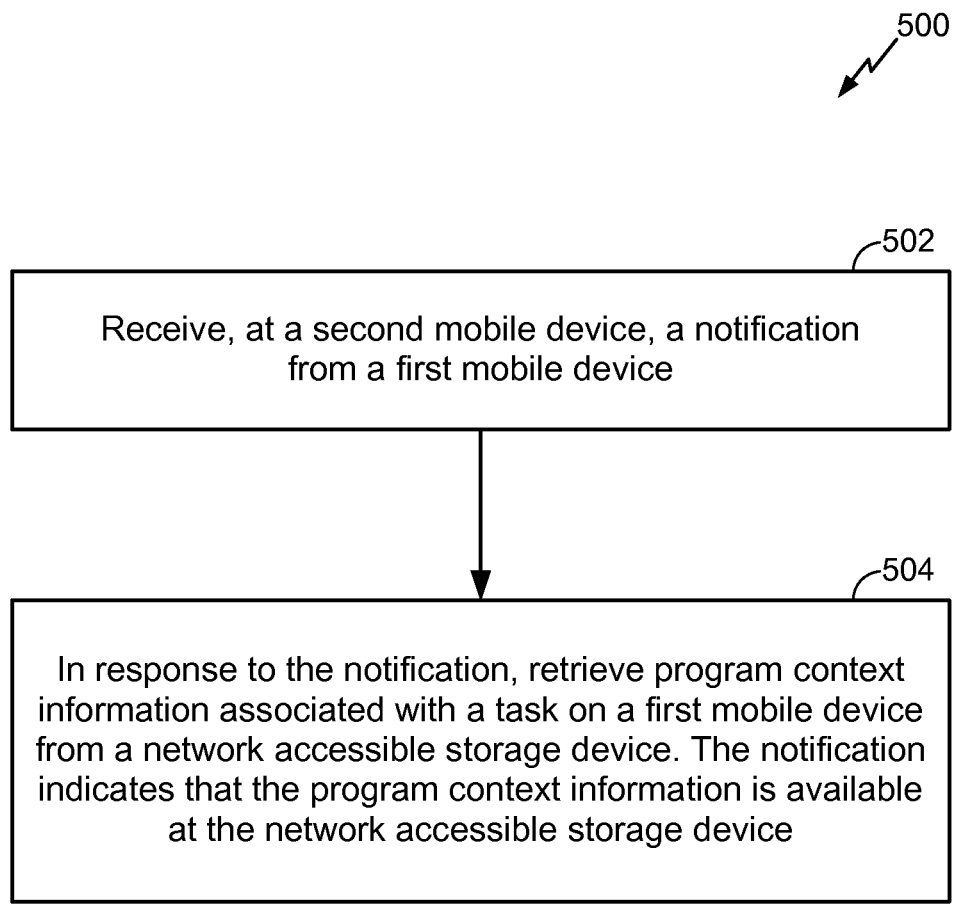
FIG. 5 is a flowchart to illustrate another particular embodiment of a method of operation at a second mobile device to receive a task transfer from a first mobile device.

FIG. 5 is a flowchart to illustrate a particular embodiment of a method 500 of operation at a second mobile device (e.g., the second mobile device 104 of FIG. 1, the third mobile device 106) that is to receive a task transfer from a first mobile device (e.g., the first mobile device 102). The method 500 includes receiving, at a second mobile device, a notification from a first mobile device, at 502. For example, referring to FIG. 1, the second mobile device 104 may receive the first notification 158 from the first mobile device 102. The method 500 also includes, in response to the notification, retrieving program context information associated with a task of the first mobile device from a network accessible storage device, at 504. The notification indicates that the program context information is available at the network accessible storage device. For example, referring to FIG. 1, in response to the first notification 158, the second mobile device 104 may retrieve the first program context information 154 from network accessible storage device 108 via a high energy link 160. The first notification 158 indicates that the first program context information 154 is available at the network accessible storage device 108. The one or more tasks may then be transferred from the first mobile device 102 to another device. Thus, the method 500 may enable a second mobile device to take over processing of task(s) transferred from a first mobile device such that the user may continue to perform the task(s) on the second mobile device.

Figure 6:
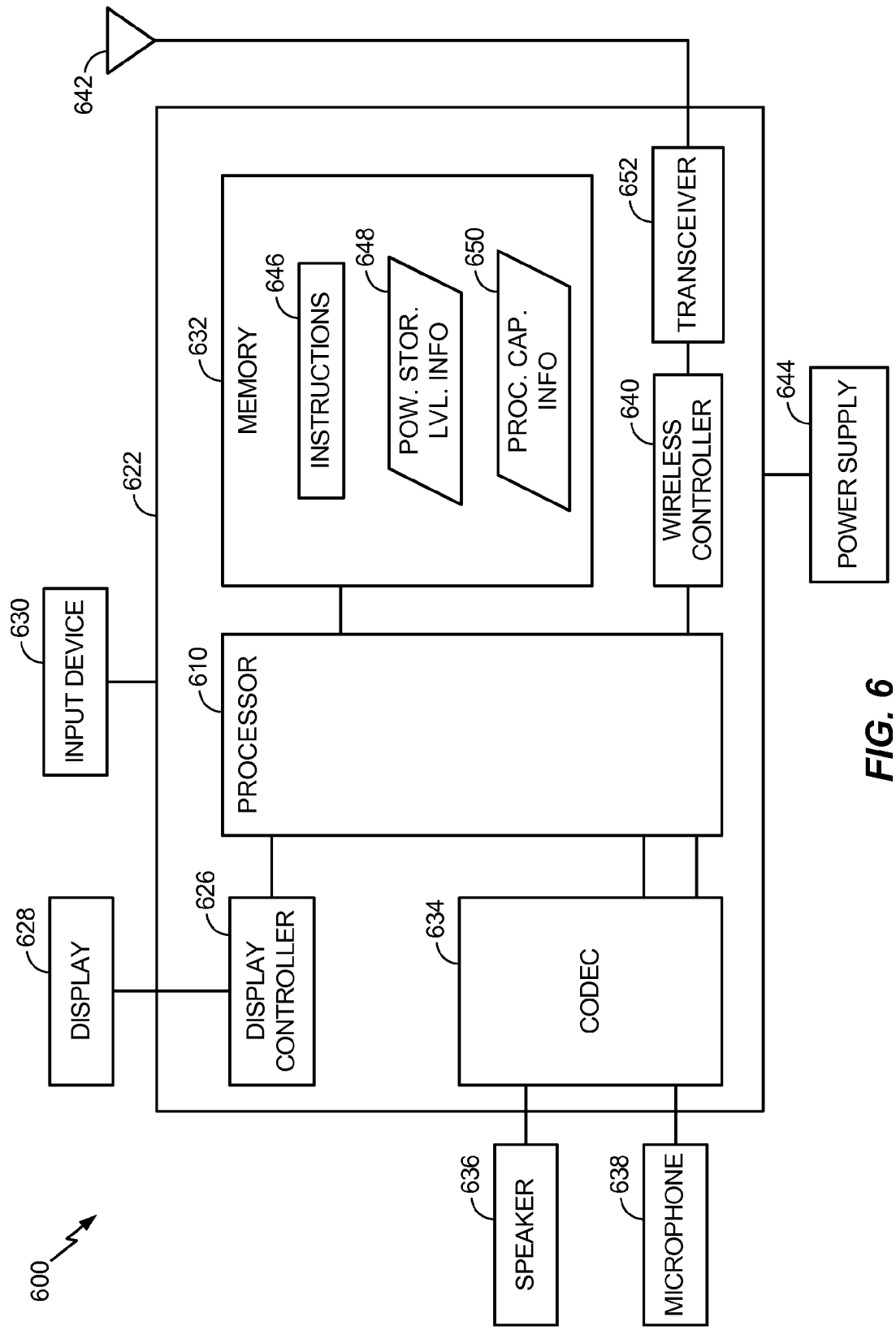
FIG. 6 is a block diagram of a communication device including components that are operable to enable a first mobile device to transfer a task of the first mobile device to a second mobile device.

FIG. 6 is a block diagram of a communication device 600. In one embodiment, the communication device 600, or components thereof, include or are included within the first mobile device 102 in FIG. 1, the second mobile device 104, the third mobile device 106, or any combination thereof. Further, the methods described in FIGS. 2-5, or certain portions thereof, may be performed at or by the communication device 600, or components thereof. The communication device 600 includes a processor 610, such as a digital signal processor (DSP), coupled to a memory 632.

The memory 632 may be a non-transitory tangible computer-readable and/or processor-readable storage device that stores instructions 646. The instructions 646 may be executable by the processor 610 to perform one or more functions or methods described herein, such as the methods described with reference to FIGS. 2-5. The memory 632 may also store power storage level information 648 (e.g., information regarding the first power storage level of the first mobile device 102, the second power storage level 146, and the third power storage level 150), processing capability information 650 (e.g., information regarding the second processing capability 148 of FIG. 1 and the third processing capability 152).

FIG. 6 shows that the communication device 600 may also include a display controller 626 that is coupled to the processor 610 and to a display device 628. A coder/decoder (CODEC) 634 can also be coupled to the processor 610. A speaker 636 and a microphone 638 can be coupled to the CODEC 634. FIG. 6 also indicates that a wireless controller 640 may be coupled to the processor 610, where the wireless controller 640 is in communication with an antenna 642 via a transceiver 652. The wireless controller 640, the transceiver 652, and the antenna 642 may represent a wireless interface that enables wireless communication by the communication device 600. For example, when the communication device 600 is the first mobile device 102 of FIG. 1, a wireless interface may be used to communicate with the second mobile device 104 and/or the third mobile device 106, as shown. The communication device 600 may include numerous wireless interfaces, where different wireless networks are configured to support different networking technologies or combinations of networking technologies (e.g., Bluetooth low energy, Near-field communication, WiFi, cellular, etc.).

In a particular embodiment, the processor 610, the display controller 626, the memory 632, the CODEC 634, the wireless controller 640, and the transceiver 652 are included in a system-in-package or system-on-chip device 622. In a particular embodiment, an input device 630 and a power supply 644 are coupled to the system-on-chip device 622. Moreover, in a particular embodiment, as illustrated in FIG. 6, the display device 628, the input device 630, the speaker 636, the microphone 638, the antenna 642, and the power supply 644 are external to the system-on-chip device 622. However, each of the display device 628, the input device 630, the speaker 636, the microphone 638, the antenna 642, and the power supply 644 can be coupled to a component of the system-on-chip device 622, such as an interface or a controller.

One or more components of the communication device 600, or components analogous thereto, may also be integrated into a mobile device, such as the first mobile device 102 of FIG. 1, the second mobile device 104, the third mobile device 106, or any combination thereof. For example, the first mobile device 102 of FIG. 1, the second mobile device 104, the third mobile device 106, or any combination thereof may include a wireless controller, a transceiver, an antenna, a processor, and a memory storing instructions executable by the processor to perform the methods of FIGS. 2-5.

In conjunction with the described embodiments, a first apparatus may include means for selecting a target mobile device based on information regarding a power storage level of the particular mobile device when a first power storage level of a first mobile device fails to satisfy a first threshold. For example, the means for selecting may include one or more components (e.g., a processor) of the first mobile device 102 of FIG. 1, one or more components (e.g., a processor) of the second mobile device 104, one or more components (e.g., a processor) of the third mobile device 106, one or more other devices configured to select a mobile device to take over processing of a task, or any combination thereof.

The first apparatus further includes means transmitting. The means for transmitting is configured to transmit program context information associated with a task of the first mobile device to a network accessible storage device and to transmit a notification regarding the program context information to the target mobile device. For example, the means for transmitting may include one or more components (e.g., a transmitter) of the first mobile device 102 of FIG. 1, one or more components (e.g., a transmitter) of the second mobile device 104, one or more components (e.g., a transmitter) of the third mobile device 106, the wireless controller 640, the transceiver 652, the antenna 642 of FIG. 6, one or more other devices configured to transmit data, or any combination thereof.

A second apparatus may include means for receiving, at a second mobile device, a notification from a first mobile device. For example, the means for receiving may include one or more components (e.g., a receiver) of the first mobile device 102 of FIG. 1, one or more components (e.g., a receiver) of the second mobile device 104, one or more components (e.g., a receiver) of the third mobile device 106, the wireless controller 640, the transceiver 652, the antenna 642 of FIG. 6, one or more other devices configured to receive data, or any combination thereof. The second apparatus may also include means for retrieving program context information associated with a task of the first mobile device from a network accessible storage device. For example, the means for retrieving may include one or more components (e.g., a receiver) of the first mobile device 102 of FIG. 1, one or more components (e.g., a receiver) of the second mobile device 104, one or more components (e.g., a receiver) of the third mobile device 106, the wireless controller 640, the transceiver 652, the antenna 642 of FIG. 6, one or more other devices configured to retrieve data, or any combination thereof.

One or more of the disclosed embodiments may be implemented in a system or an apparatus that includes a portable music player, a personal digital assistant (PDA), a mobile location data unit, a mobile phone, a cellular phone, a computer, a tablet, a portable digital video player, or a portable computer. Additionally, the system or the apparatus may include a communications device, a fixed location data unit, a set top box, an entertainment unit, a navigation device, a monitor, a computer monitor, a television, a tuner, a radio, a satellite radio, a music player, a digital music player, a video player, a digital video player, a digital video disc (DVD) player, a desktop computer, any other device that stores or retrieves data or computer instructions, or a combination thereof. As another illustrative, non-limiting example, the system or the apparatus may include remote units, such as global positioning system (GPS) enabled devices, navigation devices, fixed location data units such as meter reading equipment, or any other device that stores or retrieves data or computer instructions, or any combination thereof. Although one or more of FIGS. 1-5 illustrate systems, apparatuses, and/or methods according to the teachings of the disclosure, the disclosure is not limited to these illustrated systems, apparatuses, and/or methods. Embodiments of the disclosure may be suitably employed in any device that includes a memory, a processor, and circuitry.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed or that the first element must precede the second element in some manner. Also, unless stated otherwise a set of elements may comprise one or more elements.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

Various illustrative components, blocks, configurations, modules, circuits, and steps have been described above generally in terms of their functionality. Whether such functionality is implemented as hardware or processor executable instructions depends upon the particular application and design constraints imposed on the overall system. Additionally, the various operations of methods described above (e.g., any operation illustrated in FIGS. 1-5) may be performed by any suitable means capable of performing the operations, such as various hardware and/or software component(s), circuits, and/or module(s). Skilled artisans may implement the described functionality in varying ways for each particular application, but such implementation decisions should not be interpreted as causing a departure from the scope of the present disclosure.

Those of skill in the art would further appreciate that the various illustrative logical blocks, configurations, modules, circuits, and algorithm steps described in connection with the present disclosure may be implemented or performed with a general purpose processor, a digital signal processor (DSP), an application specific integrated circuit (ASIC), a field programmable gate array (FPGA), a programmable logic device (PLD), discrete gate or transistor logic, discrete hardware components (e.g., electronic hardware), computer software executed by a processor, or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored as one or more instructions or code on a computer-readable medium. Computer-readable media includes computer readable storage media and communication media including any medium that facilitates transfer of computer program data from one place to another. A storage media may be any available media that can be accessed by a computer. By way of example, and not limitation, such computer readable storage media can include random access memory (RAM), read-only memory (ROM), programmable read-only memory (PROM), erasable PROM (EPROM), electrically erasable PROM (EEPROM), register(s), hard disk, a removable disk, a compact disc read-only memory (CD-ROM), other optical disk storage, magnetic disk storage, magnetic storage devices, or any other medium that can be used to store program code in the form of instructions or data and that can be accessed by a computer. In the alternative, the computer-readable media (e.g., a storage medium) may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), and floppy disk where disks usually reproduce data magnetically, while discs reproduce data optically with lasers. Thus, in some aspects computer readable medium may include a non-transitory computer readable medium (e.g., tangible media). Combinations of the above should also be included within the scope of computer-readable media.

The methods disclosed herein include one or more steps or actions. The method steps and/or actions may be interchanged with one another without departing from the scope of the claims. In other words, unless a specific order of steps or actions is specified, the order and/or use of specific steps and/or actions may be modified without departing from the scope of the disclosure.

Certain aspects may include a computer program product for performing the operations presented herein. For example, a computer program product may include a computer-readable storage medium having instructions stored (and/or encoded) thereon, the instructions being executable by one or more processors to perform the operations described herein. The computer program product may include packaging material.

Further, it should be appreciated that modules and/or other appropriate means for performing the methods and techniques described herein can be downloaded and/or otherwise obtained by a user terminal and/or base station as applicable. Alternatively, various methods described herein can be provided via storage means (e.g., RAM, ROM, or a physical storage medium such as a compact disc (CD)). Moreover, any other suitable technique for providing the methods and techniques described herein can be utilized. It is to be understood that the scope of the disclosure is not limited to the precise configuration and components illustrated above.

The previous description of the disclosed embodiments is provided to enable a person skilled in the art to make or use the disclosed embodiments. While the foregoing is directed to aspects of the present disclosure, other aspects of the disclosure may be devised without departing from the basic scope thereof, and the scope is determined by the claims that follow. Various modifications, changes and variations may be made in the arrangement, operation, and details of the embodiments described herein without departing from the scope of the disclosure or the claims. Thus, the present disclosure is not intended to be limited to the embodiments herein but is to be accorded the widest scope possible consistent with the principles and novel features as defined by the following claims and equivalents thereof.

What is claimed is:
1. A method comprising:
selecting a target mobile device based on information regarding a power storage level of the target mobile device;

transmitting program context information associated with a task of a first mobile device, through a connection using a network, to a network accessible storage device; and transmitting a notification, from the first mobile device directly to the target mobile device, through a connection outside the network that uses lower electrical power to transmit data than the connection using the network, wherein the notification indicates that the program context information is available at the network accessible storage device.

2. The method of claim 1, further comprising:

receiving information regarding a second power storage level of a second mobile device;

receiving information regarding a third power storage level of a third mobile device; and selecting one of the second mobile device and the third mobile device as the target mobile device based on a comparison of the second power storage level and the third power storage level.

3. The method of claim 2, further comprising polling the second mobile device for the information regarding the second power storage level.

4. The method of claim 3, wherein the polling is stopped when a first power level of the first mobile device fails to satisfy a first threshold.

5. The method of claim 1, further comprising receiving a notification regarding a power storage level change of another mobile device.

6. The method of claim 5, wherein the notification is not transmitted to the first mobile device when a first power level of the first mobile device fails to satisfy a first threshold.

7. The method of claim 1, wherein the program context information indicates one or more states of one or more applications running on the first mobile device.

8. The method of claim 1, wherein the program context information indicates a presence of a voice call on the first mobile device.

9. The method of claim 8, further comprising establishing a conference call with the target mobile device to transfer the voice call from the first mobile device to the target mobile device.

10. The method of claim 8, wherein the program context information also comprises a subscriber identity module card number.

11. The method of claim 1, further comprising receiving electrical power from the target mobile device to charge a power storage device of the first mobile device.

12. The method of claim 1, further comprising selecting the target mobile device further based on information regarding a processing capability of the target mobile device.

13. The method of claim 1, wherein the target mobile device is integrated into an automobile.

14. The method of claim 1, wherein the network connection is an Ethernet connection, and wherein the connection outside the network is a Bluetooth low energy (BLE) connection.

15. The method of claim 1, further comprising:

transmitting a second notification to the target mobile device when a first power storage level satisfies a second threshold;

receiving a third notification regarding second program context information, wherein the second program context information is transmitted to the network accessible storage device from the target mobile device, and wherein the second program context information is associated with the task; and retrieving the second program context information from the network accessible storage device.

16. The method of claim 15, wherein the second threshold is greater than a first threshold.

17. The method of claim 1, wherein the notification is sent subsequent to transmitting the program context information to the network accessible storage device.

18. The method of claim 1, wherein the target mobile device is selected when a first power storage level of the first mobile device fails to satisfy a first threshold.

19. The method of claim 18, wherein the first power storage level is less than or equal to the first threshold.

20. A method comprising:

receiving, at a second mobile device, a notification directly from a first mobile device through a connection outside a first network, wherein the notification indicates that program context information is available at a network accessible storage device; and in response to the notification, retrieving program context information associated with a task of the first mobile device from the network accessible storage device through a connection using the first network, wherein the connection outside the first network uses lower electrical power to transmit data than the connection using the first network.

21. The method of claim 20, further comprising transmitting a message that includes information regarding a power storage level of the second mobile device to the first mobile device.

22. The method of claim 21, wherein the message is transmitted in response to a polling message received from the first mobile device.

23. The method of claim 20, further comprising automatically charging a power storage device of the first mobile device when a power storage level of the power storage device fails to satisfy a threshold.

24. The method of claim 20, further comprising transmitting second program context information associated with the task to the network accessible storage device.

25. The method of claim 20, wherein the first mobile device is a mobile phone, and wherein the second mobile device is a computing device.

26. The method of claim 25, wherein the computing device is a tablet computer.

27. The method of claim 20, further comprising transmitting second program context information associated with the task to the network accessible storage device in response to receiving a message from the first mobile device indicating that a power storage level of the first mobile device satisfies a threshold.

28. The method of claim 20, further comprising receiving a handover command from the first mobile device when a power storage level of the first mobile device fails to satisfy a threshold.

29. The method of claim 20, wherein the notification is transmitted via a near field communication protocol.

30. The method of claim 20, further comprising:

receiving a second notification from the first mobile device;

in response to the second notification, transmitting second program context information associated with the task to the network accessible storage device; and transmitting a third notification regarding the second program context information to the first mobile device.

31. An apparatus comprising:
a processor; and
a memory storing instructions executable by the processor to:
  select a target mobile device based on information regarding a power storage level of the target mobile device;
  initiate transmission of program context information associated with a task of a first mobile device, through a connection using a network, to a network accessible storage device; and
  initiate transmission of a notification, from the first mobile device directly to the target mobile device, through a connection outside the network that uses lower electrical power to transmit data than the connection using the network, wherein the notification indicates that the program context information is available at the network accessible storage device.

32. The apparatus of claim 31, wherein the instructions are further executable by the processor to:
  initiate transmission of a second notification to the target mobile device when a first power storage level satisfies a second threshold; and
  initiate retrieval of second program context information from the network accessible storage device in response to a third notification, received from the target mobile device, regarding the second program context information, wherein the second program context information is transmitted to the network accessible storage device from the target mobile device, and wherein the second program context information is associated with the task.

33. An apparatus comprising:
a processor; and
a memory storing instructions executable by the processor to:
  receive a notification, at a second mobile device, directly from a first mobile device through a connection outside a first network, wherein the notification indicates that program context information is available at a network accessible storage device, and
  retrieve, at a second mobile device, the program context information associated with a task of the first mobile device from the network accessible storage device through a connection using the first network in response to the notification, wherein the connection outside the first network uses lower electrical power to transmit data than the connection using the first network.

34. The apparatus of claim 33, wherein the instructions are further executable by the processor to:
  in response a second notification received from the first mobile device, initiate transmission of second program context information associated with the task to the network accessible storage device; and
  initiate transmission of a third notification regarding the second program context information that is available at the network accessible storage device to the first mobile device.

35. An apparatus comprising:
  means for selecting a target mobile device based on information regarding a power storage level of the target mobile device;
  means for transmitting program context information associated with a task of a first mobile device, through a connection using a network, to a network accessible storage device; and
  means for transmitting a notification, from the first mobile device directly to the target mobile device, through a connection outside the network that uses lower electrical power to transmit data than the connection using the network, wherein the notification indicates that the program context information is available at the network accessible storage device.

36. An apparatus comprising:
  means for receiving, at a second mobile device, a notification directly from a first mobile device through a connection outside a first network, wherein the notification indicates that program context information is available at a network accessible storage device; and
  means for retrieving program context information associated with a task of the first mobile device from the network accessible storage device through a connection using the first network in response to the notification, wherein the connection outside the first network uses lower electrical power to transmit data than the connection using the first network.

37. A non-transitory computer-readable storage medium comprising processor-executable instructions that, when executed by a processor, cause the processor to:
  select a target mobile device based on information regarding a power storage level of the target mobile device;
  initiate transmission of program context information associated with a task of a first mobile device, through a connection using a network, to a network accessible storage device; and
  initiate transmission of a notification, from the first mobile device directly to the target mobile device, through a connection outside the network that uses lower electrical power to transmit data than the connection using the network, wherein the notification indicates that the program context information is available at the network accessible storage device.

38. A non-transitory computer-readable storage medium comprising processor-executable instructions that, when executed by a processor, cause the processor to:
  receive a notification, at a second mobile device, directly from a first mobile device through a connection outside a first network, wherein the notification indicates that program context information is available at a network accessible storage device, and
  retrieve, at a second mobile device, the program context information associated with a task of the first mobile device from the network accessible storage device through a connection using the first network in response to the notification, wherein the connection outside the first network uses lower electrical power to transmit data than the connection using the first network.

* * * * *